United States Patent
Wang et al.

(10) Patent No.: US 10,419,748 B2
(45) Date of Patent: Sep. 17, 2019

(54) SYSTEM AND METHOD FOR DETECTING IMAGE STICKING ON DISPLAY

(71) Applicant: Shenzhen China Star Optoelectronics Technology Co., Ltd., Shenzhen, Guangdong (CN)

(72) Inventors: Yanxue Wang, Guangdong (CN); Lixuan Chen, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 212 days.

(21) Appl. No.: 15/303,075

(22) PCT Filed: Sep. 6, 2016

(86) PCT No.: PCT/CN2016/098169
§ 371 (c)(1),
(2) Date: Oct. 10, 2016

(87) PCT Pub. No.: WO2018/028012
PCT Pub. Date: Feb. 15, 2018

(65) Prior Publication Data
US 2018/0184079 A1    Jun. 28, 2018

(30) Foreign Application Priority Data
Aug. 8, 2016 (CN) .......................... 2016 1 0645080

(51) Int. Cl.
*H04N 17/00* (2006.01)
*H04N 17/04* (2006.01)
*G06T 7/00* (2017.01)

(52) U.S. Cl.
CPC ......... *H04N 17/004* (2013.01); *G06T 7/0004* (2013.01); *H04N 17/04* (2013.01);
(Continued)

(58) Field of Classification Search
CPC ..... H04N 17/004; G06T 7/0004; G06T 7/408; G06T 7/90
(Continued)

(56) References Cited

U.S. PATENT DOCUMENTS 7,136,056 B2 * 11/2006 Lee .................. G09G 3/006
345/207
8,248,328 B1 * 8/2012 Wedding ............. H01J 11/18
345/60

(Continued)

FOREIGN PATENT DOCUMENTS

CN     101325021 A    12/2008
CN     101425246 A    5/2009
(Continued)

*Primary Examiner* — Brian P Yenke
*Assistant Examiner* — Sean N. Haiem
(74) *Attorney, Agent, or Firm* — Andrew C. Cheng

(57) ABSTRACT

The disclosure discloses a system and a method for detecting image sticking on a display. The method includes dividing a display image on the display equally into at least two identical sections, one of the at least two sections is as a reference section, drawing sectional chess board images according to a size of the reference section, Fourier transforming the sectional chess board images and each of the sections of the display image respectively, obtaining characteristic frequencies of image sticking on each of the sections and first spectrum energy values in each of spectrum structures correspondingly, additionally obtaining second spectrum energy values of reference frequencies of each of the sections in frequency domain structures, obtaining ratios of the first spectrum energy values to the second spectrum energy values corresponding to each of the sections.

6 Claims, 3 Drawing Sheets

(52) U.S. Cl.
CPC ............... *G06T 2207/10024* (2013.01); *G06T 2207/20021* (2013.01); *G06T 2207/20056* (2013.01); *G06T 2207/30121* (2013.01)

(58) Field of Classification Search
USPC ............... 345/589, 214, 87, 89, 98, 207, 63; 348/191, 177, 701
See application file for complete search history.

(56) References Cited

U.S. PATENT DOCUMENTS

| | | | | |
|---|---|---|---|---|
| 2002/0094128 A1* | 7/2002 | Shu | .................. | G06T 5/004 382/261 |
| 2003/0214586 A1* | 11/2003 | Lee | .................. | G09G 3/006 348/180 |
| 2008/0106508 A1* | 5/2008 | Lee | .................. | G09G 3/3611 345/89 |
| 2008/0106649 A1* | 5/2008 | Prusia | .................. | G09G 5/003 348/701 |
| 2009/0096778 A1* | 4/2009 | Su | .................. | G09G 3/006 345/214 |
| 2010/0096988 A1* | 4/2010 | Kitabayashi | .......... | H01L 27/326 315/51 |
| 2015/0154939 A1* | 6/2015 | Zhan | .................. | G06T 7/00 345/589 |
| 2015/0255029 A1* | 9/2015 | Niikura | .................. | G09G 3/3648 345/98 |
| 2015/0256823 A1* | 9/2015 | De Paepe | .............. | H04N 17/04 348/177 |
| 2015/0371576 A1* | 12/2015 | Li | .................. | G09G 3/006 345/87 |
| 2016/0198153 A1* | 7/2016 | An | .................. | H04N 5/225 348/191 |
| 2017/0214911 A1 | 7/2017 | Wang et al. | | |
| 2018/0204491 A1* | 7/2018 | Wang | .................. | G06F 17/14 |

FOREIGN PATENT DOCUMENTS

| | | |
|---|---|---|
| CN | 101655409 A | 2/2010 |
| CN | 103050074 A | 4/2013 |
| JP | 2001223882 A | 8/2001 |

\* cited by examiner

SYSTEM AND METHOD FOR DETECTING IMAGE STICKING ON DISPLAY

FIELD OF THE DISCLOSURE

The disclosure relates to a display technical field, and more particularly to a system and a method for detecting image sticking on a display.

BACKGROUND OF THE DISCLOSURE

Image sticking on a liquid crystal panel is detected during designing the liquid crystal panel, which is displaying one image (e.g. a chess board image) on the liquid crystal panel for more than 100 hours, and observing an image sticking grade of the last image after changing another image. A common reliance of detecting image sticking is a just noticeable difference model based on a judgement of human eyes with over-highly subjective factors.

SUMMARY OF THE DISCLOSURE

The disclosure provides a system and a method for detecting image sticking on a display, which can evaluate a grade of local image sticking on a display image objectively and efficiently.

To solve the technical problem above, the disclosure provides a method for detecting image sticking on a display, including obtaining a display to be detected on image sticking, dividing a display image on the display equally into at least two identical sections, one of the at least two sections is as a reference section, drawing sectional chess board images according to a size of the reference section, Fourier transforming the sectional chess board images and each of the sections of the display image respectively, obtaining characteristic frequencies of image sticking on each of the sections and first spectrum energy values in each of spectrum structures correspondingly, additionally obtaining second spectrum energy values of reference frequencies of each of the sections in frequency domain structures, obtaining ratios of the first spectrum energy values to the second spectrum energy values corresponding to each of the sections, obtaining a maximum ratio of the ratios corresponding to each of the sections, judging if the maximum ratio exceeds a range of qualified values corresponding to detection, exceeding the range is unqualified, otherwise, it is qualified.

Dividing a display image on the display equally into at least two identical sections includes dividing the display image on the display equally into at least two sections with an identical area and an identical shape.

Dividing the display image on the display equally into at least two sections with an identical area and an identical shape includes dividing the display image on the display equally into first rectangular sections with an identical area, an identical shape and no overlap, based on the first rectangular sections, successively dividing overlapped second rectangular sections with an identical area and an identical shape between two of the first rectangular sections and among four of the rectangular sections.

The reference frequencies are zero frequencies.

To solve the technical problem above, the disclosure further provides a method for detecting image sticking on a display, including obtaining a display to be detected on image sticking, dividing a display image on the display equally into at least two identical sections, drawing sectional chess board images according to a size of the reference section with one of the at least two sections as a reference section, Fourier transforming the sectional chess board images and each of the sections of the display image respectively, obtaining characteristic frequencies of image sticking on each of the sections and first spectrum energy values in each of spectrum structures correspondingly, additionally obtaining second spectrum energy values of reference frequencies of each of the sections in frequency domain structures, obtaining ratios of the first spectrum energy values to the second spectrum energy values corresponding to each of the sections.

The method further includes obtaining a maximum ratio of the ratios corresponding to each of the sections, judging if the maximum ratio exceeds a range of qualified values corresponding to detection, exceeding the range is unqualified, otherwise, it is qualified Dividing a display image on the display equally into at least two identical sections includes dividing the display image on the display equally into at least two sections with an identical area and an identical shape.

Dividing the display image on the display equally into at least two sections with an identical area and an identical shape includes dividing the display image on the display equally into first rectangular sections with an identical area, an identical shape and no overlap, based on the first rectangular sections, successively dividing overlapped second rectangular sections with an identical area and an identical shape between two of the first rectangular sections and among four of the rectangular sections.

The reference frequencies are zero frequencies.

To solve the technical problem above, the disclosure further provides a system for detecting image sticking on a display, including an obtaining device configured to obtain a display image to be detected on image sticking, an obtaining device configured to obtain a display image to be detected on image sticking, a drawing device configured to draw sectional chess board images according to a size of a reference section with one of the at least two sections as the reference section, a calculating device configured to Fourier transform the sectional chess board images and each of the sections of the display image and obtain characteristic frequencies of image sticking on each of the sections and first spectrum energy values in each of spectrum structures correspondingly, additionally obtaining second spectrum energy values of reference frequencies of each of the sections in frequency domain structures, further obtaining ratios of the first spectrum energy values to the second spectrum energy values corresponding to each of the sections.

The calculating device further includes an obtaining component configured to obtain a maximum ratio of the ratios corresponding to each of the sections, a judging component configured to judge if the maximum ratio exceeds a range of qualified values corresponding to detection, a processing component configured to determine to be unqualified during exceeding the range judged by the judging component, otherwise, it is qualified.

The dividing device is specifically dividing the display image on the display equally into at least two sections with an identical area and an identical shape.

The dividing device is specifically dividing the display image on the display equally into first rectangular sections with an identical area, an identical shape and no overlap, and based on the first rectangular sections, successively dividing overlapped second rectangular sections with an identical area and an identical shape between two of the first rectangular sections and among four of the rectangular sections.

The reference frequencies are zero frequencies.

Beneficial effects of the disclosure are distinguishing from a conventional technique, a system and a method for detecting image sticking on a display provided by the disclosure, including following steps, first obtaining a display to be detected on image sticking, then dividing a display image on the display equally into at least two identical sections, and one of the at least two sections is as a reference section, drawing sectional chess board images according to a size of the reference section, further Fourier transforming the sectional chess board images and each of the sections of the display image respectively to obtain characteristic frequencies of image sticking on each of the sections and first spectrum energy values in each of spectrum structures correspondingly, additionally obtaining second spectrum energy values of reference frequencies of each of the sections in frequency domain structures, finally obtaining ratios of the first spectrum energy values to the second spectrum energy values corresponding to each of the sections. The disclosure processes local image frequency domain structures, which can evaluate a grade of local image sticking on a display image objectively and efficiently.

DETAILED DESCRIPTION OF PREFERRED EMBODIMENTS

Figure 1:
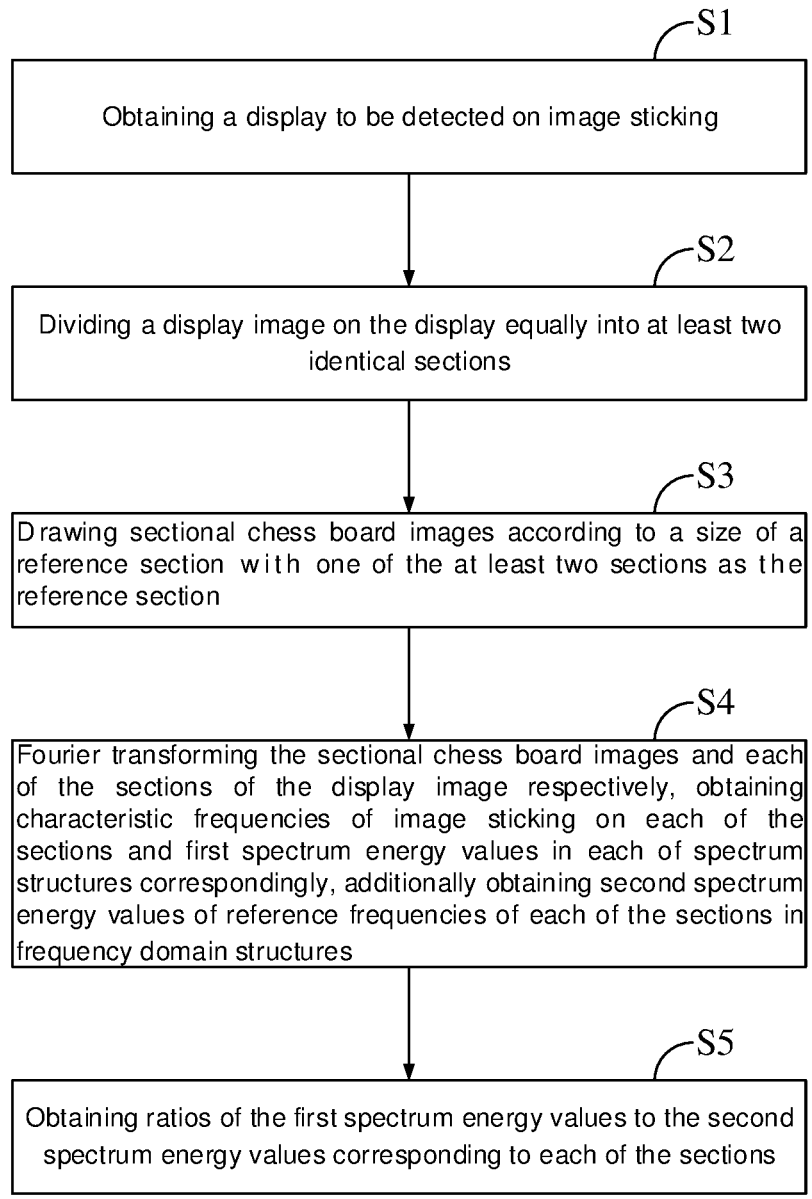
FIG. 1 is a flow chart of a method for detecting image sticking on a display according to an embodiment of the disclosure.

Referring to FIG. 1, FIG. 1 is a flow chart of a method for detecting image sticking on a display according to an embodiment of the disclosure. As shown in FIG. 1, the method of the embodiment includes following steps.

Step S1, obtaining a display to be detected on image sticking.

In the step, it is specifically to obtain a 128 grayscale display image by an image catcher such as a camera with standard shooting modes undergoing an IS experiment.

The standard shooting modes are illustrated as follows.

Camera model: Cannon600D.

A measure distance is triple a width of the display, a measure direction is perpendicular to the display.

Measure circumstance: dark room.

Camera parameters: ISO100, color space sRGB, flash off, auto-brightness: off, white balance shift/bracketing: 0, 0/±0, red eye reduction switch: off, autofocus mode: live mode, display grid: off, length-width ratio: 3:2.

Metering timer: 16 sec., bass boost: off, HDMI control: off.

Step S2, dividing a display image on the display equally into at least two identical sections.

Figure 2:
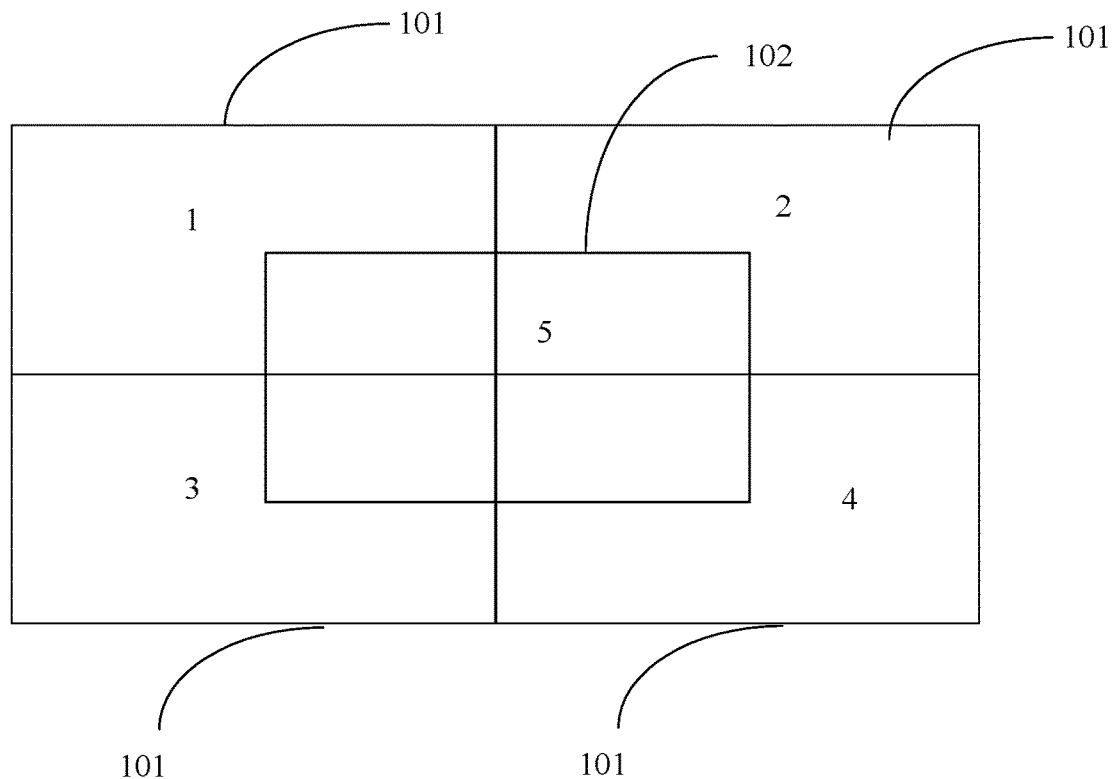
FIG. 2 is a schematic view of front 5 sections when a display image of a display is divided into 9 sections.
Figure 3:
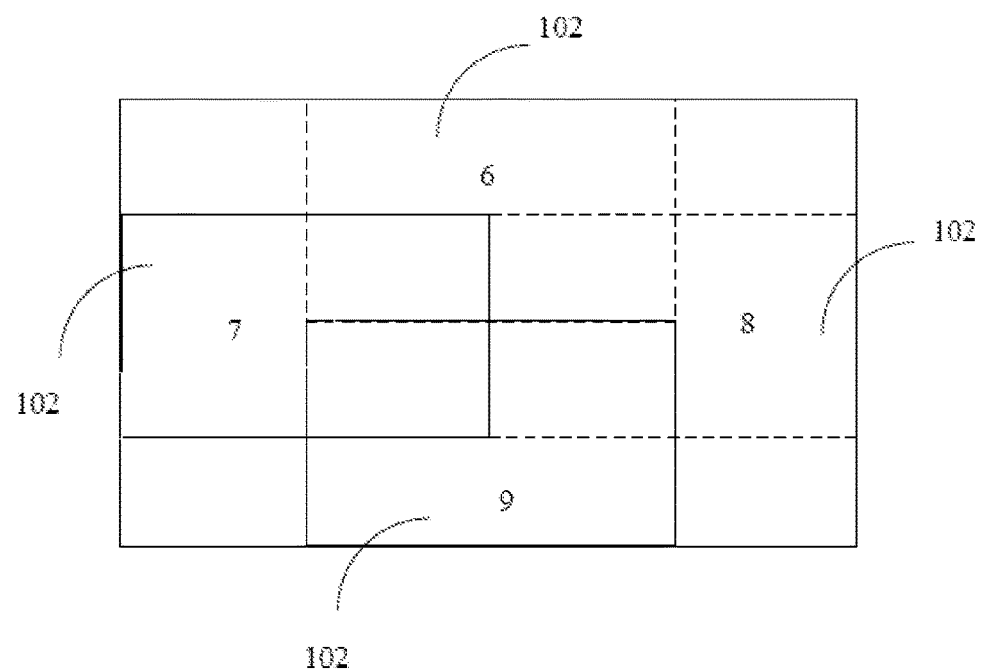
FIG. 3 is a schematic view of rear 4 sections when the display image of the display is divided into 9 sections.

In the step, the amount of sections is determined by reality, such as 9 sections, 25 sections, etc. Referring to FIG. 2 and FIG. 3 showing a dividing method of 9 sections, FIG. 2 is a schematic view of front 5 sections when a display image of a display is divided into 9 sections, FIG. 3 is a schematic view of rear 4 sections when the display image of the display is divided into 9 sections. The dividing method of dividing into 9 sections is dividing the display image into 9 sections, and an area, a cycle and the amount of blocks of each of the 9 sections are all equal.

Specifically, at least two identical sections include an identical area, an identical cycle or the identical amount of blocks of the two sections. Which is dividing the display image on the display equally into at least two sections with an identical area and an identical shape. To be more specific, the display image on the display is equally divided into first rectangular sections 101 with an identical area and an identical shape, then based on the first rectangular sections 101, overlapped second rectangular sections 102 with an identical area and an identical shape are successively divided between two of the first rectangular sections 101 and among four of the rectangular sections 101.

Step S3, one of the at least two sections as a reference section, drawing sectional chess board images according to a size of the reference section. Such as a section 5 in FIG. 2 is as the reference section, the sectional chess board images drew accordingly to a size of the section 5 are shown as FIG. 4.

Step S4, Fourier transforming the sectional chess board images and each of the sections of the display image respectively, specifically is two-dimensional Fourier transforming, to obtain characteristic frequencies of image sticking on each of the sections and first spectrum energy values in each of spectrum structures correspondingly, additionally obtaining second spectrum energy values of reference frequencies of each of the sections in frequency domain structures. The reference frequencies are zero frequencies.

Figure 4:
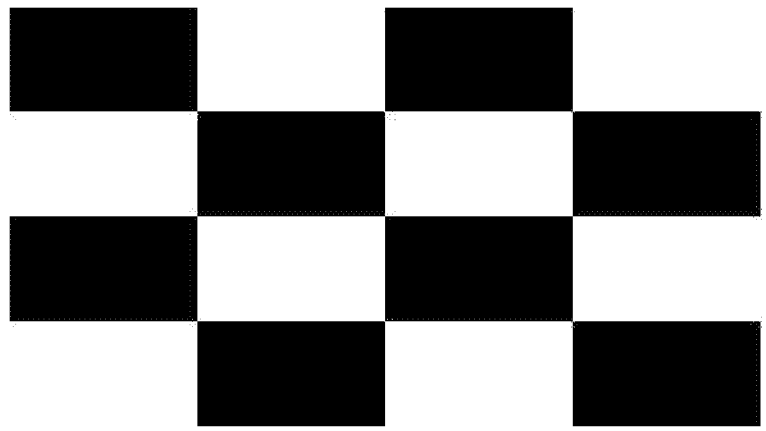
FIG. 4 is a view of chess board images drew according to a size of a reference section.

Deriving from the example of 9 sections above, the sectional chess board images shown as FIG. 4 and 9 sections of the display image are Fourier transformed respectively to obtain characteristic frequencies of image sticking of the 9 sections 1-9 and first spectrum energy values in each of spectrum structures correspondingly, marked as L1'~L9'.

Spectral energy values corresponding to zero frequencies of the 9 sections of the display image in the spectrum structures are read and marked as L1~L9, which are the spectral energy values corresponding to 9 sections image background intensities.

Step S5, obtaining ratios of the first spectrum energy values to the second spectrum energy values corresponding to each of the sections. It is specifically obtaining a maximum ratio of the ratios corresponding to each of the sections, then judging if the maximum ratio exceeds a range of qualified values corresponding to detection, if it exceeds the range, it will be unqualified, otherwise, it is qualified.

With regard to the 9 sections mentioned above, the first spectrum energy values $Li'$ of the characteristic frequencies of the sections are divided by the spectrum energy values $Li$ corresponding to the zero frequencies to obtain evaluation values of image sticking on each of the sections, $Yi=Li'/Li$, the image sticking is severer when $Yi$ is larger. A section with the severest image sticking of the 9 sections or the maximum $Yi$ can be taken to be the evaluation value to evaluate the final image sticking degree of the entire display image.

The display image shown in FIG. 2 and FIG. 3 is taken as an example to give image sticking evaluation values of the 9 sections as follows.

| Section | 1 | 2 | 3 | 4 | 5 | 6 | 7 | 8 | 9 |
|---------|---|---|---|---|---|---|---|---|---|
| Ratio | 3.0552 | 1.9475 | 1.9440 | 2.5595 | 0.7954 | 1.3746 | 2.4196 | 2.3507 | 1.5548 |

It can be known from the evaluation values above that section 1 is the severest section on image sticking in FIG. 2 and FIG. 3. Accordingly the ratio of section 1 is judged to exceed the range of qualified values corresponding to detection or not, if it exceeds the range, it will be unqualified, otherwise, it is qualified.

It is derived from the above that the embodiment obtains the display image and divides the display image into several sections equally for respectively processing, each of the sections of the display image of the display is processed by two-dimensional Fourier transform, the characteristic frequencies corresponding to image sticking on the sections in the spectrum structures and the corresponding spectrum energy values are taken to calculate ratios to the spectrum energy values corresponding to zero frequencies, finally obtaining evaluation values of image sticking degree on each of the sections, so that the severity degree of local image sticking can be evaluated objectively and quantitatively to reduce influence of subjective factors and improve resolution power of IS.

Figure 5:
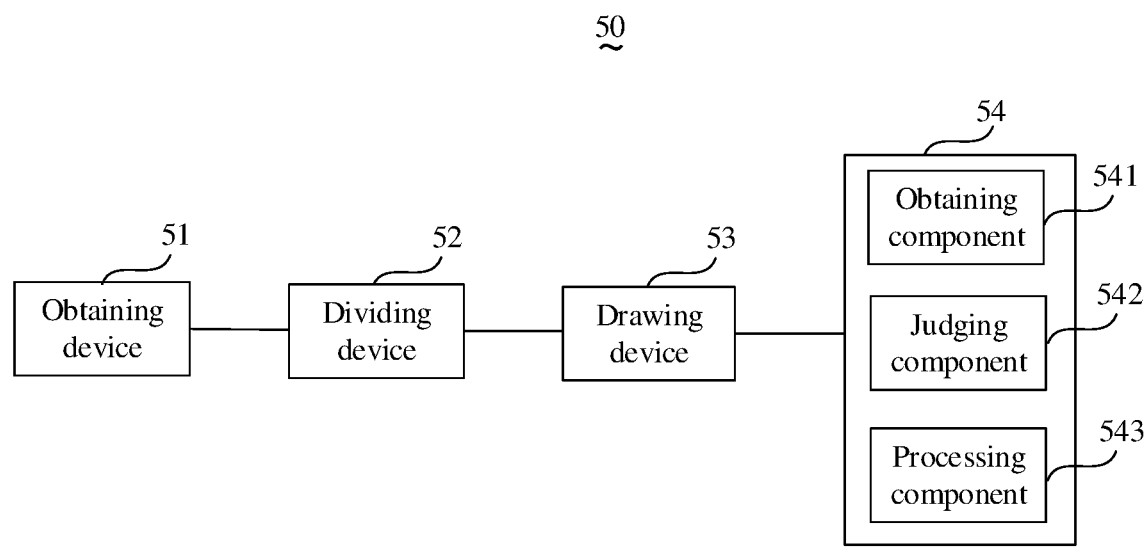
FIG. 5 is a structural schematic view of a system for detecting image sticking on a display according to an embodiment of the disclosure.

Referring to FIG. 5, FIG. 5 is a structural schematic view of a system for detecting image sticking on a display according to an embodiment of the disclosure. As shown in FIG. 5, the system 50 for detecting image sticking on a display of the embodiment includes an obtaining device 51, a dividing device 52, a drawing device 53 and a calculating device 54.

The obtaining device 51 is configured to obtain a display image to be detected on image sticking. The obtaining device 51 can be an image catcher such as a camera. In the embodiment, the obtaining device 51 is preferably a camera to obtain a 128 grayscale display image with standard shooting modes undergoing an IS experiment.

The standard shooting modes are illustrated as follows.
Camera model: Cannon600D.
A measure distance is triple a width of the display, a measure direction is perpendicular to the display.
Measure circumstance: dark room.
Camera parameters: ISO100, color space sRGB, flash off, auto-brightness: off, white balance shift/bracketing: 0, 0/±0, red eye reduction switch: off, autofocus mode: live mode, display grid: off, length-width ratio: 3:2.
Metering timer: 16 sec., bass boost: off, HDMI control: off.

The dividing device is configured to divide a display image on the display equally into at least two identical sections. The amount of sections is determined according to reality, such as 9 sections, 25 sections, etc. Referring to FIG. 2 and FIG. 3 showing a dividing method of 9 sections, FIG. 2 is a schematic view of front 5 sections when a display image of a display is divided into 9 sections, FIG. 3 is a schematic view of rear 4 sections when the display image of the display is divided into 9 sections.

Specifically, at least two identical sections include an identical area, an identical cycle or the identical amount of blocks of the two sections. Which is the dividing device 52 divides the display image on the display equally into at least two sections with an identical area and an identical shape. To be more specific, the display image on the display is equally divided into first rectangular sections 101 with an identical area and an identical shape, then based on the first rectangular sections 101, second rectangular sections 102 overlapped with an identical area and an identical shape successively divided between two of the first rectangular sections 101 and among four of the rectangular sections 101.

The drawing device 53 is configured to draw sectional chess board images according to a size of the reference section with one of the at least two sections as the reference section. Such as a section 5 in FIG. 2 is as the reference section, the sectional chess board images drew accordingly to a size of the section 5 are shown as FIG. 4.

The calculating device 54 is configured to Fourier transform the sectional chess board images and each of the sections of the display image respectively, specifically is two-dimensional Fourier transforming, to obtain characteristic frequencies of image sticking on each of the sections and first spectrum energy values in each of spectrum structures correspondingly, additionally obtaining second spectrum energy values of reference frequencies of each of the sections in frequency domain structures. The reference frequencies are zero frequencies.

Deriving from the example of 9 sections above, the sectional chess board images shown as FIG. 4 and 9 sections of the display image are Fourier transformed respectively to obtain characteristic frequencies of image sticking of the 9 sections 1-9 and first spectrum energy values in each of spectrum structures correspondingly, marked as L1'~L9'.

Spectral energy values corresponding to zero frequencies of the 9 sections in the spectrum structures are read and marked as L1~L9, which are the spectral energy values corresponding to 9 sections image background intensities.

Furthermore, the calculating device 54 further obtains ratios of the first spectrum energy values to the second spectrum energy values corresponding to each of the sections. Specifically, the calculating device 54 includes an obtaining component 541, a judging component 542 and a processing component 543.

The obtaining component 541 is configured to obtain a maximum ratio of the ratios corresponding to each of the sections.

The judging component 542 is configured to judge if the maximum ratio exceeds a range of qualified values corresponding to detection.

The processing component 543 is configured to determine to be unqualified when the judging component 542 judges it to exceed the range, otherwise, it is qualified.

With regard to the 9 sections mentioned above, the first spectrum energy values Li' of the characteristic frequencies of the sections are divided by the spectrum energy values Li corresponding to the zero frequencies to obtain evaluation values of image sticking on each of the sections, Yi=Li'/Li, the image sticking is severer when Yi is larger. A section with the severest image sticking of the 9 sections or the maximum Yi can be taken to be the evaluation value to evaluate the final image sticking degree of the entire display image.

The display image shown in FIG. 2 and FIG. 3 is taken as an example to give image sticking evaluation values of the 9 sections as follows.

| Section | 1 | 2 | 3 | 4 | 5 | 6 | 7 | 8 | 9 |
|---|---|---|---|---|---|---|---|---|---|
| Ratio | 3.0552 | 1.9475 | 1.9440 | 2.5595 | 0.7954 | 1.3746 | 2.4196 | 2.3507 | 1.5548 |

It can be known from the evaluation values above that section 1 is the severest section on image sticking in FIG. 2 and FIG. 3. Accordingly the ratio of section 1 is judged to exceed the range of qualified values corresponding to detection or not, if it exceeds the range, it will be unqualified, otherwise it is qualified.

Overall, the disclosure avoids subjectivity of judging image sticking based on eyes effectively, which evaluates image sticking degree objectively, the image sticking degrees on various sections on a display image are evaluated efficiently.

Aiming at the IS experience required by all panel manufacturers, the disclosure can be configured to detect and evaluate local image sticking immediately and quantitatively during and after the IS experience, which can reduce labor costs and time of IS judgement, as well as influence of subjectivity caused by eyes.

Above are merely embodiments of the disclosure, which do not limit the protection scope of the disclosure. Any equivalent structure or process according to the disclosure and the figures, or application in other relative fields directly or indirectly should be covered by the protected scope of the disclosure.

What is claimed is:

1. A method for detecting image sticking on a display, comprising:

obtaining a display image on the display which is to be detected on image sticking;

dividing the display image on the display equally into at least two identical sections;

selecting one of the at least two sections as a reference section, drawing the reference section with a sectional chess board image, wherein the sectional chess board image is drew according to a size of the reference section such that only an entire of the reference section is replaced by the sectional chess board image, and the reference section is different from other sections;

two-dimensional Fourier transforming the sectional chess board image in the reference section and each of the other sections of the display image respectively, to obtain characteristic frequencies of image sticking on each of the sections and first spectrum energy values of each of the sections in each of spectrum structures correspondingly, additionally to obtain second spectrum energy values of each of the sections under a reference frequency in frequency domain structures;

obtaining ratios of the first spectrum energy values to the second spectrum energy values corresponding to each of the sections;

obtaining a maximum ratio of the ratios corresponding to each of the sections;

judging if the maximum ratio exceeds a range of qualified values corresponding to detection, exceeding the range unqualified, otherwise qualified;

wherein dividing a display image on the display equally into at least two identical sections comprises:

dividing the display image on the display equally into at least two sections with an identical area and an identical shape.

2. The method according to claim 1, wherein dividing the display image on the display equally into at least two sections with an identical area and an identical shape comprises:

dividing the display image on the display equally into first rectangular sections with the identical area, the identical shape and no overlap;

based on the first rectangular sections, successively dividing second rectangular sections with the identical area and the identical shape between two of the first rectangular sections and among four of the rectangular sections, wherein each of the second rectangular sections is at least partially overlapped with at least one of the first rectangular sections.

3. The method according to claim 1, wherein the reference frequency is a zero frequency.

4. A system for detecting image sticking on a display, comprising:

an obtaining device, configured to obtain a display image on the display which is to be detected on image sticking;

a dividing device, configured to divide the display image on the display equally into at least two identical sections;

a drawing device, configured to draw a sectional chess board image in a reference section by selecting one of the at least two sections as the reference section, wherein the sectional chess board image is drew according to a size of the reference section such that only an entire of the reference section is replaced by the sectional chess board image and the reference section is different from other sections;

a calculating device, configured to two-dimensional Fourier transform the sectional chess board images image in the reference section and each of the other sections of the display image, to obtain characteristic frequencies of image sticking on each of the sections and first spectrum energy values of each of the sections in each of spectrum structures correspondingly, additionally to obtain second spectrum energy values of each of the sections under a reference frequency in frequency domain structures, and the calculating device is further configured to obtain ratios of the first spectrum energy values to the second spectrum energy values corresponding to each of the sections;

the calculating device further comprises:

an obtaining component, configured to obtain a maximum ratio of the ratios corresponding to each of the sections;

a judging component, configured to judge if the maximum ratio exceeds a range of qualified values corresponding to detection;

a processing component, configured to determine to be unqualified during exceeding the range judged by the judging component, otherwise qualified;

the dividing device is specifically dividing the display image on the display equally into at least two sections with an identical area and an identical shape.

5. The system according to claim 4, wherein the dividing device is specifically dividing the display image on the display equally into first rectangular sections with the identical area, the identical shape and no overlap, and based on the first rectangular sections, successively dividing overlapped second rectangular sections with the identical area and the identical shape between two of the first rectangular sections and among four of the rectangular sections, wherein each of the second rectangular sections is at least partially overlapped with at least one of the first rectangular sections.

6. The system according to claim 4, wherein the reference frequency is a zero frequency.

* * * * *